US010237308B2

(12) United States Patent
Arzunian

(10) Patent No.: US 10,237,308 B2
(45) Date of Patent: Mar. 19, 2019

(54) REAL-TIME COMMUNICATION NETWORK APPLICATION BASED ON A SHARED SPECIFIC LOCATION

(71) Applicant: Valeriy Arzunian, Bethlehem, PA (US)

(72) Inventor: Valeriy Arzunian, Bethlehem, PA (US)

(*) Notice: Subject to any disclaimer, the term of this patent is extended or adjusted under 35 U.S.C. 154(b) by 0 days.

(21) Appl. No.: 15/400,394

(22) Filed: Jan. 6, 2017

(65) Prior Publication Data

US 2018/0146014 A1 May 24, 2018

Related U.S. Application Data

(60) Provisional application No. 62/425,687, filed on Nov. 23, 2016.

(51) Int. Cl.
*H04W 24/00* (2009.01)
*H04L 29/06* (2006.01)
*H04L 29/08* (2006.01)
*H04W 4/021* (2018.01)
*G01S 19/13* (2010.01)
*G06Q 50/00* (2012.01)
*H04W 76/10* (2018.01)

(52) U.S. Cl.
CPC .......... *H04L 65/1069* (2013.01); *G01S 19/13* (2013.01); *G06Q 50/01* (2013.01); *H04L 67/10* (2013.01); *H04L 67/18* (2013.01); *H04L 67/306* (2013.01); *H04W 4/021* (2013.01); *H04W 76/10* (2018.02)

(58) Field of Classification Search
CPC .. H04W 4/021; H04W 76/02; H04L 65/1069; G06Q 50/01; G01S 19/13
USPC ...................................................... 455/456.3
See application file for complete search history.

(56) References Cited

U.S. PATENT DOCUMENTS

| 2012/0252418 | A1* | 10/2012 | Kandekar | H04W 4/021 |
| | | | | 455/414.1 |
| 2013/0066986 | A1* | 3/2013 | DiCosola | G06Q 10/10 |
| | | | | 709/206 |
| 2014/0114738 | A1* | 4/2014 | Tseng | G06Q 30/0241 |
| | | | | 705/14.27 |
| 2017/0201858 | A1* | 7/2017 | Li | H04W 4/021 |

* cited by examiner

*Primary Examiner* — Charles T Shedrick
(74) *Attorney, Agent, or Firm* — Reza Mollaaghababa; Thomas J. Engellenner; Pepper Hamilton LLP

(57) ABSTRACT

A geo-social networking system utilizes location-based information to connect mobile users in real-time over a network to other users located at the same place. A mobile device determines the geographic location of the user and uses the location to generate a list of places within the vicinity of the specific geographical location of the user, allowing the user to check-in at a place, causing the mobile device to display a list of users who are also within/checked into the same specific place and display messages amongst the users. Once the location-aware mobile device detects the user has left the place, or the user checks out of that place, the communication ends between the user and other users checked-in at that place.

23 Claims, 6 Drawing Sheets

REAL-TIME COMMUNICATION NETWORK APPLICATION BASED ON A SHARED SPECIFIC LOCATION

RELATED APPLICATION

The present application claims priority to provisional application 62/425,687 that was filed on Nov. 23, 2016. This application incorporates the content of the provisional application by reference in its entirety.

FIELD OF INVENTION

This invention generally relates to location-based messaging systems and methods. More particularly, the present invention relates to the procedures and methods that facilitate location-based communication between a plurality of location-aware mobile devices at a specific place or places.

BACKGROUND

Networking applications have become an ordinary means for connecting people. Different systems already exist to facilitate connections generally, including the connection of friends over social networking applications and business connections over business networking applications. Such networks are generally organized by a pre-established social relationship and without regard to the geographical proximity. As such, these networks are limited by traditional methods of facilitating new connections, communication and response. However, finding new connections can be difficult or limited by social circles.

Due to the widespread use of technology, there is an increased trend for mobile devices to employ location-based services. These services, often facilitated by the use of a Global Positioning System (GPS), determine the location of a mobile device in order to provide additional information and services associated with that specific location. These services can include previous comments and reviews of a place, menus, store information, previous check-in histories of other users inside of your network, but the mobile devices generally lack access to real-time information and real-time communication of other users also associated with that specific location, especially outside of the user's current social network. There is thus a need for an application in which a location-aware mobile device can facilitate a geo-social network in real-time to further connect users within a specific location without previous limitations generally found in communication networking applications.

SUMMARY OF THE INVENTION

A geo-social networking system is a social networking system in which geographic services and capabilities are used to enable additional social interactions. The invention utilizes specific location-based information to be incorporated within a communication application that connects users in real-time to other users located at the same specific place. The process is executed on a location-aware mobile device coupled to a computer-based server over a wireless network. The process utilizes the mobile devices location tracking hardware to determine the specific geographic location of the user. The information is used to generate a list of places within the vicinity of the specific geographical location of the user. These places include a variety of establishments such as businesses, places of interest, events, and other locations. A user may check-in at a place by selecting the place from a list of places on the mobile device. The check-in feature will prompt the mobile device to display a list of users who are also within/checked into the same specific place. In various embodiments, the user is able to privately message another user or join a live group chat room with other users who are also checked-in at the same place. These conversations are generally limited to the specific place and otherwise inaccessible outside of that place. Once the location-aware mobile device detects the user has left the place, or the users check out of that place, the communication ends between the user and other users checked-in at that place.

Accordingly, several objects and advantages of the present invention can include: enriching the quality of communication of users within specific places, providing a way for meaningful groups to form, and connecting users which are unlikely to communicate without the application. Limiting the ability of users such that they connect to only one place within their approximate location, for example, can allow users who have checked-in at a clothing store to discuss topics related solely to that place without the trouble of dealing with other various conversations related to other nearby places. If users are found to be outside the approximate location, they are automatically checked-out of that place. By connecting users solely based on location, the application encourages meaningful conversation related to that place.

According to one embodiment, non-transient computer-readable instructions form a client application configured for operating on a location-aware mobile device. The instructions include a location-determination module configured to generate information regarding a geographical location of the mobile device from at least one sensor on the mobile device and a check-in module in communication with the location-determination module configured to receive the information regarding a geographical location of the mobile device and to identify one or more nearby places for display to, and selection by, a user of the mobile device, wherein the geographical location of the mobile device is within a predetermined vicinity of each of the one or more nearby places. The instructions further include a message module configured to selectively connect the user via a real-time communications network to one or more mobile devices of other users currently located at a selected one of the one or more places in response to user selection of one of the one or more nearby places. Communication to mobile devices not currently located at the selected one or more places is restricted by the client application.

In some embodiments, the check-in module is configured to facilitate a check-in selection of one of the one or more nearby places by the user of the mobile device, wherein the check-in selection allows the user to selectively communicate with users of other mobile devices that have also made a check-in selection of the same one of the one or more nearby places. In some embodiments, the check-in module is configured to facilitate a check-out selection by the user to end communication with the users of other mobile devices at the one of the one or more nearby places and to allow the user to make another check-in selection at another one of the one or more nearby places. In some embodiments, the check-in module is configured to automatically make a check out selection if the mobile device moves outside the predetermined vicinity of the selected nearby place. In some embodiments, the location-determination module receives Global Positioning System (GPS) coordinates of the mobile device from a GPS sensor of the mobile device. In some embodiments, a profile module is configured to store profile information of the user of the mobile device.

In some embodiments, instructions include a processing and communication module configured to provide communication between the client application and a server via the communications network. In some embodiments, a server includes a location database, a user database and a user-provided database. In some embodiments, the server includes a database query module configured to compare the geographical location of the mobile device to a plurality of potential nearby places. In some embodiments, the processing and communication module sends the information regarding the geographical location of the mobile device to the server and the server employs the query module and the location database to generate a list of the nearby places and communicates the list to the processing and communication module on the mobile device. In some embodiments, the processing and communications module relays the received list of the nearby places to the check-in module, which displays the list to the user. In some embodiments, upon selection of a nearby place by the user, the processing and communication module sends the user's selection to the server.

According to another embodiment, a method of facilitating real-time communications between users of mobile devices located within proximity to one another includes steps of generating, via a processor of a mobile device, information regarding geographical location of the mobile device from at least one sensor on the mobile device, and communicating, by the processor, the information regarding geographical location of the mobile device to a server over a network. Additional steps include identifying, by the processor, based on information received from the server, a list of nearby places for display to, and selection by, a user of the mobile device, wherein the geographical location of the mobile device is within a predetermined vicinity of each of the nearby places and selectively connecting the user, by the processor via a real-time messaging interface over a network, to one or more mobile devices of other users currently located at a selected one of the nearby places in response to user selection of one of the list of nearby places. Communication to mobile devices not currently located at the selected one or more places is restricted by the processor.

In some embodiments, an exemplary method includes a step of facilitating a check-in selection of a first nearby place by the user of the mobile device, wherein the check-in selection allows the user to selectively communicate with users of other mobile devices that have also made a check-in selection of the first nearby place. In some embodiments, an exemplary method includes a step of facilitating a check-out selection by the user to end communication with the users of other mobile devices at the first nearby place and a step of allowing the user to make another check-in selection at a second nearby place from the list of nearby places.

In some embodiments, an exemplary method includes a step of automatically making a check out selection, by the processor, if the mobile device moves outside the predetermined vicinity of the selected nearby place. In some embodiments, an exemplary method includes a step of storing profile information of the user of the mobile device and utilizing the profile information to configure the real-time communications interface in accordance with user preferences. In some embodiments, an exemplary method includes a step of configuring the server to compare the geographical location of the mobile device to a plurality of potential nearby places.

According to another embodiment, a method of facilitating real-time communications between users of mobile devices located within proximity to one another includes configuring a location-determination module on a mobile device to generate information regarding a geographical location of the mobile device from at least one sensor on the mobile device, configuring, on the mobile device, a check-in module in communication with the location-determination module to receive the information regarding a geographical location of the mobile device and to identify one or more nearby places for display to, and selection by, a user of the mobile device, wherein the geographical location of the mobile device is within a predetermined vicinity of each of the one or more nearby places, and configuring, on the mobile device, a message module to selectively connect the user via a real-time communications network to one or more mobile devices of other users currently located at a selected one of the one or more places in response to user selection of one of the one or more nearby places. Communication to mobile devices not currently located at the selected one or more places is restricted by the client application.

In some embodiments, the step of configuring the check-in module includes configuration to facilitate a check-in selection of one of the one or more nearby places by the user of the mobile device, wherein the check-in selection allows the user to selectively communicate with users of other mobile devices that have also made a check-in selection of the same one of the one or more nearby places. In some embodiments, the step of configuring the check-in module includes configuration to facilitate a check-out selection by the user to end communication with the users of other mobile devices at the one of the one or more nearby places and to allow the user to make another check-in selection at another one of the one or more nearby places.

In some embodiments, the step of configuring the check-in module includes configuration to automatically make a check out selection if the mobile device moves outside the predetermined vicinity of the selected nearby place. In some embodiments, an exemplary method includes a step of configuring a processing and communication module to provide communication between the client application and a server via the communications network.

In some embodiments, an exemplary method includes a step of configuring the server to include a location database, a user database and a user-provided database. In some embodiments, an exemplary method includes a step of configuring the server to include a database query module configured to compare the geographical location of the mobile device to a plurality of potential nearby places. In some embodiments, an exemplary method includes a step of configuring the processing and communication module to send the information regarding the geographical location of the mobile device to the server and configuring the server to employ the query module and the location database to generate a list of the nearby places and to communicate the list to the processing and communication module on the mobile device.

Both the abovementioned brief overview and the following detailed description provide examples which are explanatory only and should not be considered restrictive. Features or variation may be provided in addition to those set forth herein. For example, embodiments may be directed to various feature combinations described in the detailed description.

BRIEF DESCRIPTION OF THE DRAWINGS

FIG. 2 is an illustration of an exemplary embodiment of a user interface of the application showing a list of nearby places for the user to select from;

DETAILED DESCRIPTION OF THE INVENTION

Figure 1:
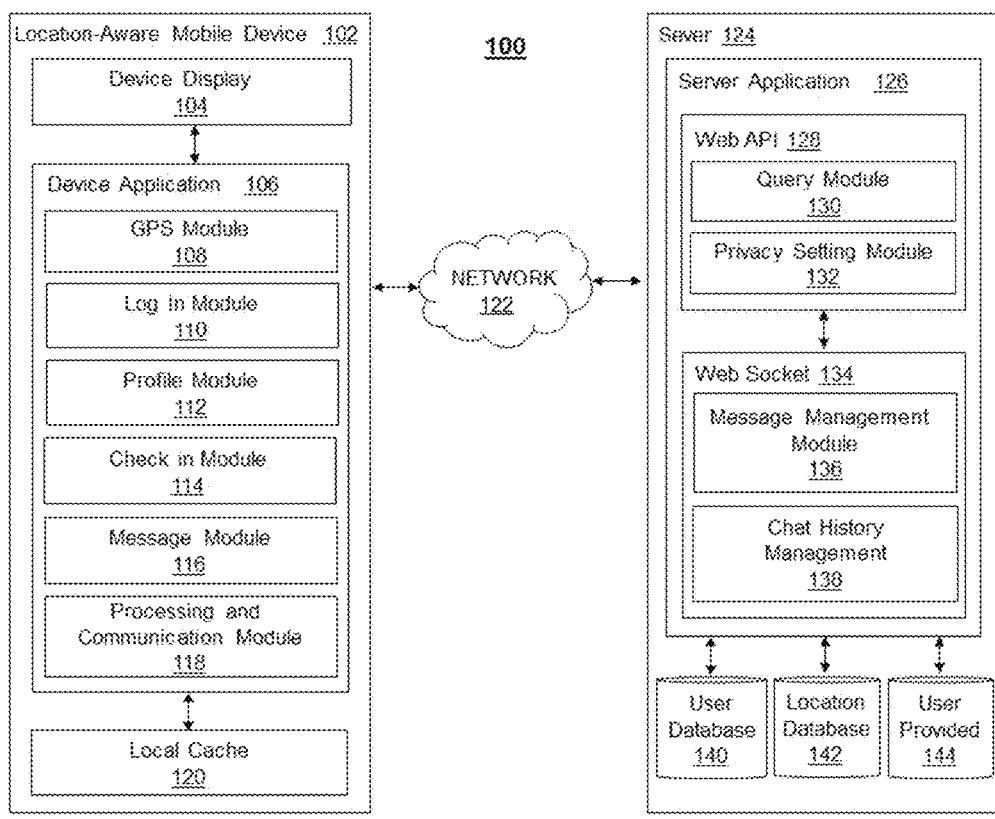
FIG. 1 is a block diagram that illustrates an exemplary architecture between a location-aware mobile device and the computer based server.

Embodiments of a system that utilize specific location-based information to be incorporated within a communication application are described with reference to the drawings, wherein like reference numerals are used to refer to like elements throughout. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

As used in this application, the terms 'module' and 'system' are intended to refer to a computer-related entity, either hardware, a combination of hardware and software, software, or software in execution. For example, a module can be, but is not limited to being, a process running on a processor, an object, an executable, a thread of execution, a program, and/or a computer. By way of illustration, both an application running on a server and the server can be a module or system. One or more modules can reside within a process and/or thread of execution, and a module can be localized on one computer and/or distributed between two or more computers.

Embodiments are directed to a location-based system that enables the display of places, where users and messages correspond to that place. FIG. 1 is a block diagram that illustrates a system architecture 100 for enabling location-aware communication amongst users by utilizing communication between a location-aware mobile devices 102 (e.g., each user has a location-aware mobile device 102) and the computer-based server 124, which manages communication among users within a place via a real-time messaging interface (e.g., a real-time chat room or similar messaging interface, which can include messaging persistence in some embodiments, while other embodiments choose not to keep messages for long periods of time, such as more than an hour). For illustrative purposes, architecture 100 and the relationship between mobile device 102 and the server 124 is shown in a simplified form, showing only a single mobile device. In architecture 100, a plurality of location-aware mobile devices 102, such as cellphones or tablets having a GPS sensor, are coupled to a mobile communication network 122, (such as a cell network or over Wi-Fi, which is coupled via the Internet) to a server 124. The location-aware mobile devices 102 are operated by a user and communicate with one another using known communication methods, such as Wi-Fi, GSM, LTE, etc.

In one embodiment, the location-aware mobile device 102 comprises a device display 104, a processor configured to execute a device application 106 (the application can in turn be said to include the processor, memory, software, and local hardware sufficient to execute the application), and a local cache 120. The device location application 106 includes software modules that can interact with memory or with hardware devices in mobile device 102, including a Global Positioning System ("GPS") module 108, a log-in module 110, profile module 112, check-in module 114, message module 116 and processing and communication module 118. The GPS module 108 receives GPS coordinates from the location-aware mobile device 102 (e.g., from a GPS sensor that monitors timing signals from satellites) to determine the current geographic location of the user. In an exemplary embodiment, the location-aware mobile device 102 utilizes the internal GPS as a tracking mechanism, where the GPS uses a GPS satellite to track the location of the mobile device 102. In other embodiments, the mobile device 102 may use alternative tracking mechanisms such as an assisted GPS, a cell of origin system or other location tracking systems in addition to or in lieu of the GPS satellite. In some embodiments, the Wi-Fi antenna can determine the MAC address of the nearest wireless access point, allowing a rough location lookup to be performed by server 124.

To identify unique accounts, and therefore, users of the accounts within the device application 106, a log-in module 110 prompts the user to enter a username and password (or other authentication information, such as a fingerprint, face scan, or other biometric data) to log-in to the device application 106 where they are identified by a profile. A profile module 112 manages the user's online profile, which is unique to that user. In one embodiment, the user profile module 112 also allows the user to add or delete images and videos to the profile, invite friends or remove friends and followers, and offers customizable widgets and other add-ons. The check-in module 114 displays the places within the geographic location of the mobile device 102 for the user to select from. Once the user has checked in at a place, the user can send messages, images, and videos to other users within the same place by utilizing the message module 116. In an exemplary method, the processing and communication module 118 encapsulates all of the data associated with the device application and sends the data over the network 122 to the server 124.

In one embodiment, a computer based server 124 comprises a server application 126 and maintains various databases. The server application 126 includes a web API 128 framework and a web socket 134. The web API 128 includes a query module 130 and privacy setting module 132. The web socket 134 includes a message management module 136 which includes chat history management 138. The server application 126 can query the various databases, including a user database 140, location database 142 and a user provided data base 144. User check-in information provided by the check-in module 114 is stored on the user database 140. The geographical locations of places, such as businesses, places of interest, events and other locations, are stored on the location database 142. The information in the location database is used to generate a list of places within the specific geographical location of the mobile device 102.

The profile module 112 utilizes the user-provided database 144, which stores the users profile information, images, videos, friends, followers, and other information provided to the profile module 112.

Figure 2:
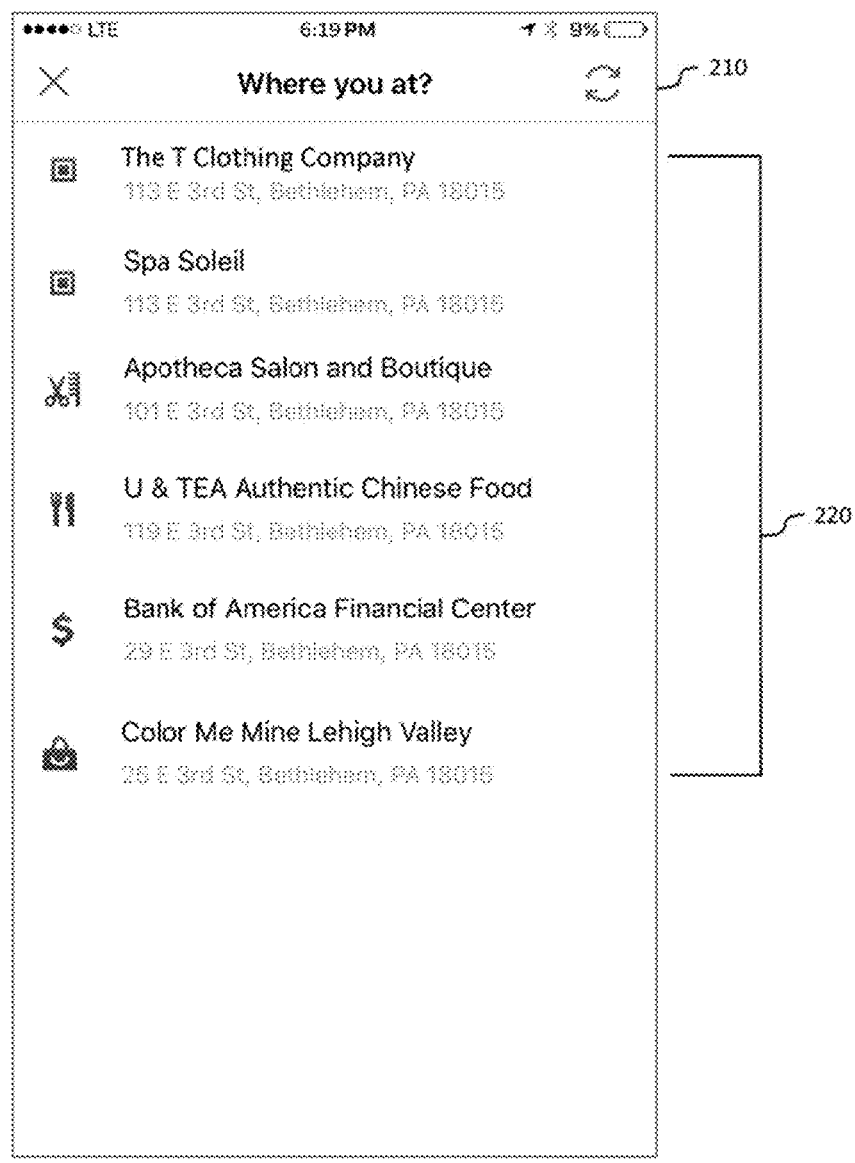

FIG. 2 illustrates an example of one embodiment of a user interface, displayed on the device display 104, representing a list of nearby places 200. If the mobile device 102 continues to move, a refresh 210 option exist to query a new list of places 200 for the device to display. Each place 220 includes the name and address of the place 220, which is found within the location database 142. Each of the nearby places can be defined as a place by the server having a predefined vicinity. That is, each place can be modeled by the server as a geographical area with predefined bounds. This vicinity definition can be a predefined radius (such as within 100 meters of a fixe point that represents the location) or bounded area, whereby mobile devices that have coordinates within that geographical boundary are said to be within the vicinity of that place. Exemplary places that can have a predefined vicinity include local businesses, parks, events, etc.

Figure 3:
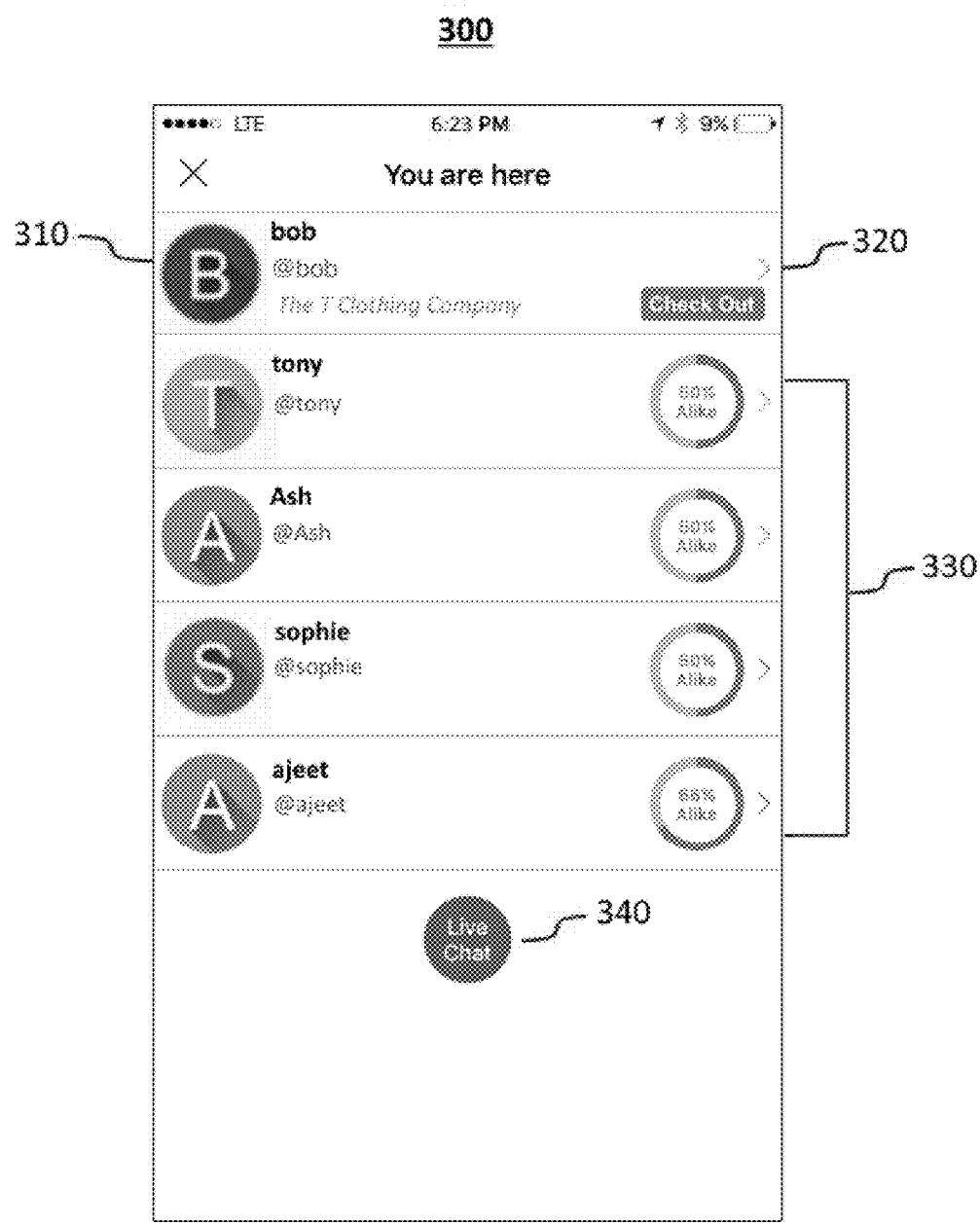
FIG. 3 is an illustration of an exemplary embodiment of a user interface of the application showing a list of users who are checked in at a specific place, in addition to an option for the user to manually check-out of the place.

FIG. 3 illustrates an example of one embodiment of a user interface, displayed on the device display 104, representing a list of users 300 who are checked in at a specific place 220. The list of users 300 checked in at a specific place 220 is stored within the user database 140 on the server 124. The user 310 of the application is shown at the top of the list of other users 300. The user 310 can choose to message other users 330, join a live chat 340, or view the profile of a particular user by utilizing the information stored within the user database 140. In this embodiment, the interface presents user 310 with a check out 320 feature to manually return the user 310 back to the list of nearby places 200 as illustrated by FIG. 2. In some embodiments the user 310 can directly message other users via this interface or participate in a group chat session where all users checked into that place can participate, post, and see communal messages.

Figure 4:
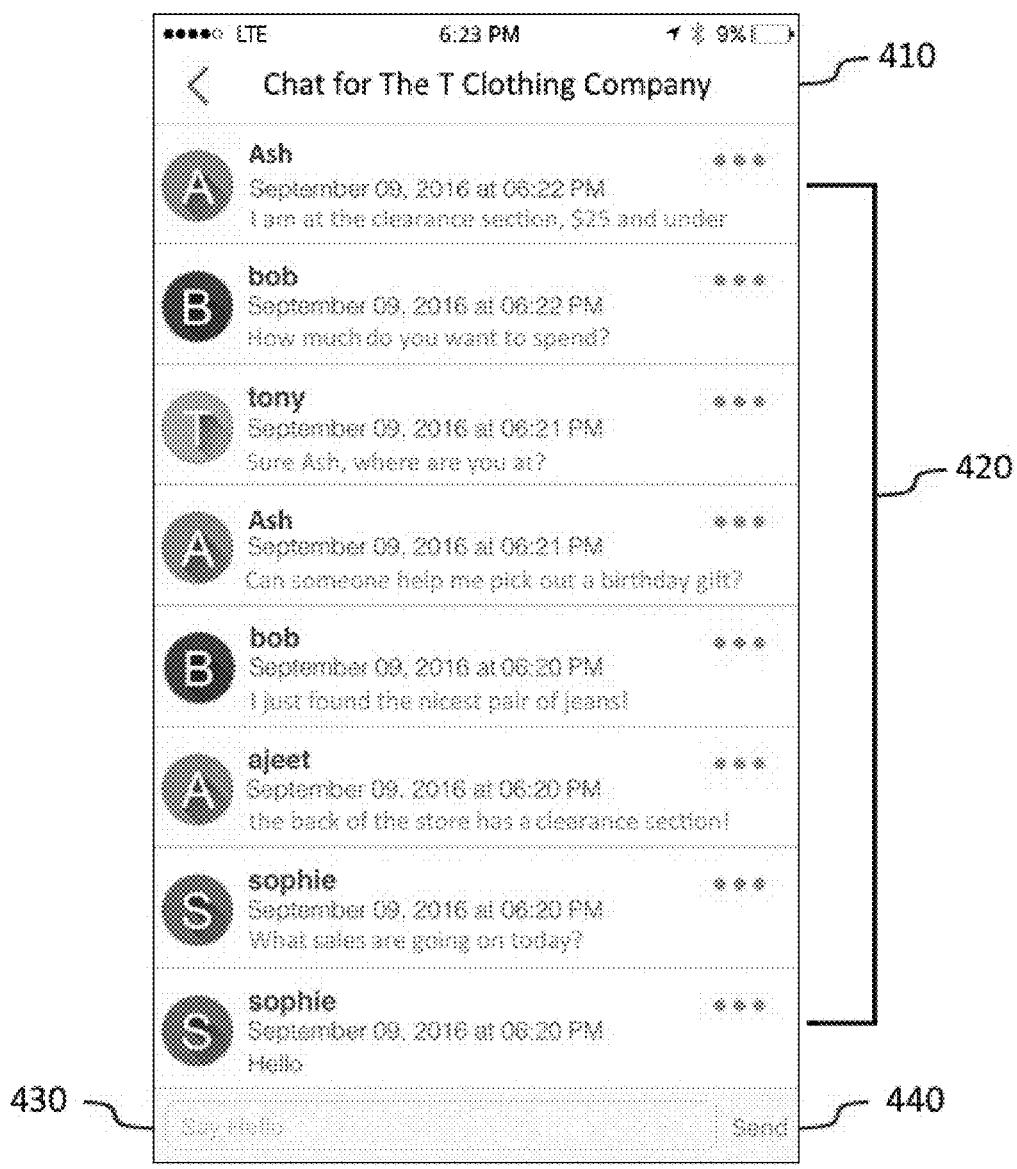
FIG. 4 is an illustration of an exemplary embodiment of user interface for use with some embodiments, showing a list of users who are checked-in at a place and are able to participate in a group chat or private chat at a specific place.

FIG. 4 illustrates an example of one embodiment of a user interface, displayed on the device display 104, representing a list of users 300 participating in a live group chat 400 at a specific place 220. The top of the user interface displays the name of the chat room 410, which represents the place 220 selected from FIG. 2. The interface also displays a list of users 300 and their corresponding messages 420. The interface also displays a box for the user 310 to input their message 430 and the corresponding send button 440 to send the message 430 to other users 330 participating in the live group chat 400.

Figure 5:
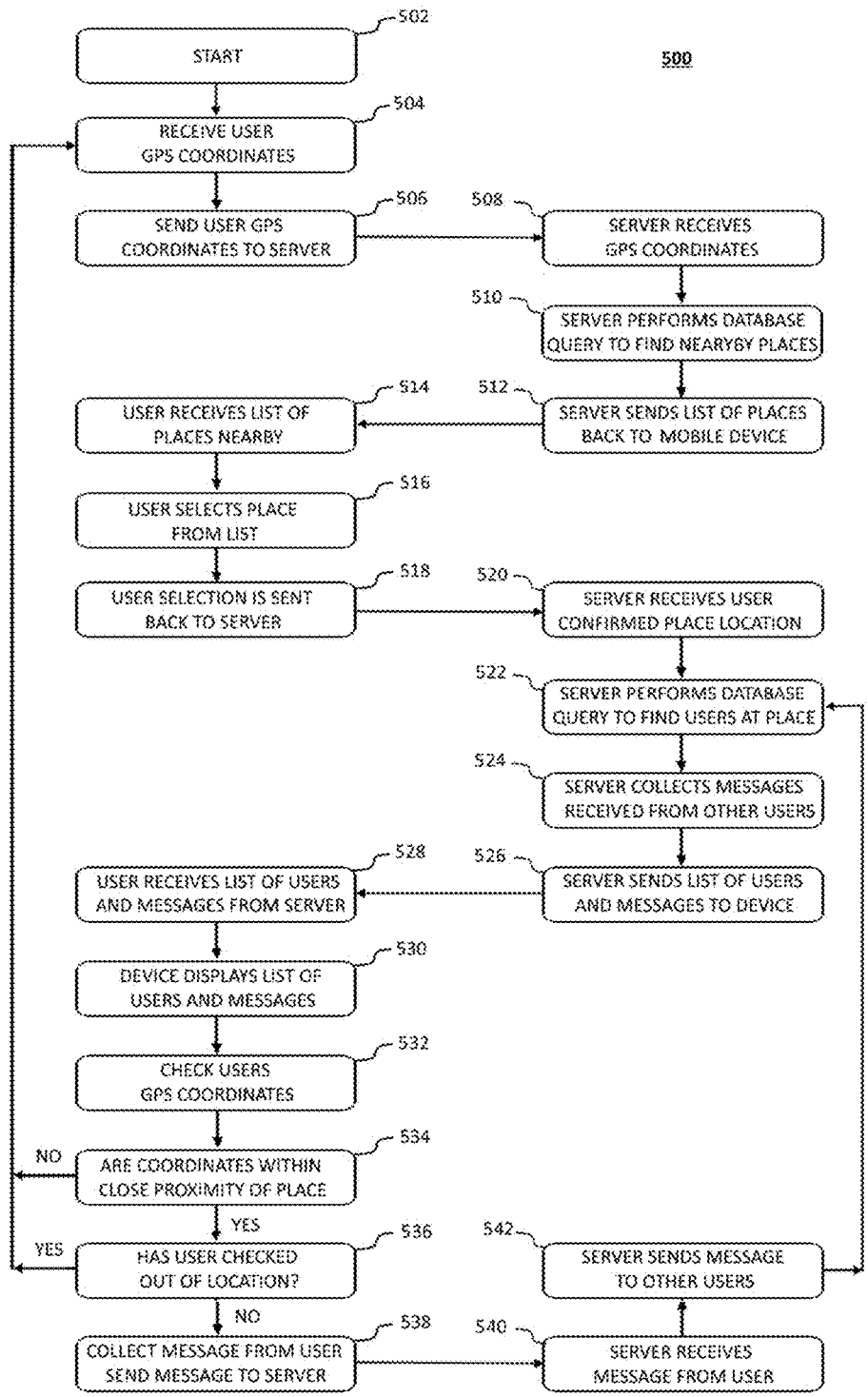
FIG. 5 is a flow chart of exemplary procedures and methods that facilitate location-based communication between a plurality of location-aware mobile devices and the computer based server.

FIG. 5 illustrates a flow chart for the procedures and methods 500 that facilitate location-based communication between a plurality of location-aware mobile devices 102 and the computer based server 124. In one embodiment, the user 310 of the mobile device 102 activates the method 500 by tapping on the screen to start 502 the process of step that allows the mobile device 102 to utilize device application.

At step 504, the GPS coordinates are acquired by the GPS module 108 from the location-aware mobile device 102. The GPS coordinates represent the approximate location of the user 310. These coordinates are stored temporarily in a location accessible to the processor of the mobile device.

At step 506, the processor of the mobile device 102 facilitates sending the GPS coordinates to the server 124. According to various embodiments, the processing and communication module 118 within the mobile device 102 sends the GPS coordinates from the GPS module 108 to the server 124.

At step 508, the server 124 receives the GPS coordinates across the network 122. In some embodiments, network 122 may include an internet network and/or other wireless or wired networks such as mobile device networks.

At step 510, the server performs a database query utilizing both the query module 130 and location database 142 to generate a list of nearby places 200 with closely related GPS coordinates received from the mobile device 102. For this query, the server determines which places include a predetermined vicinity that encompasses the location of the mobile device. In some embodiments, each place has a similar definition (e.g., 100 m from a geographical point), while in others, each place has a customizable definition of vicinity. For example, a large venue may have a larger vicinity, while a smaller shop may have a smaller defined vicinity. Similarly, during a special event a place may have a larger predefined vicinity to accommodate users in a larger area during the event.

At step 512, the server 124 sends back the list of places 200 to the mobile device 102 by utilizing the network 122. This list includes any place for which the device's location is within the predefined vicinity of that place. In some embodiments, the list of places can be filtered by the server based on user and place profiles and preferences. For example, users under the legal drinking age can be prevented from accessing a bar's chat interface. Similarly, a membership-based place, such as a members-only club or church can restrict users from seeing that place on the list unless the user is a predefined member of the community.

At step 514, the mobile device 102 receives the list of nearby places 200. The processing and communication module 118 relays the information to the check-in module 114 and displays the list of nearby places 200 to the user 310.

At step 516, the user 310 is prompted to select a specific place 220 from the list of nearby places 200 which corresponds to their current location. The check-in module 114 prevents the user 310 from accessing other places 220 outside of the approximate location until the user has checked-out of the place or the GPS module 108 has determined the user has left the place.

At step 518, the selection from the user 310 in step 516 is sent back to the server 124 by utilizing the network 122.

At step 520, the sever 124 confirms the location of the user 310 at the place 220 and stores the location of the user 310 in the user database 140. In some embodiments, the server can authenticate the user and verify that the user is authorized to participate in a local chat session. For example, abusive users can be banned from a chat session in the future or a moderator can determine which users have permission to post.

At step 522, the server 124 preforms a query on the user database 140 to locate all other users within the place 220 and generates a list of users 300.

At step 524, the server 124 will collect all recent messages received from other users 330 at that place 220.

At step 526, the server 124 will send both the list of users 300 and recent messages 420 to the device application 106 on the mobile device 102 by utilizing the network 140.

At step 528, the mobile device 102 receives the list of users 300 and messages 420 from server 124 and utilizes the processing and communication module to direct the information to the message module 116.

At step 530, the message module 116 on mobile device 102 displays the list of users 300 and messages 420 as illustrated in FIG. 3 on the device display 104. The list of users 300 and messages 420 will continuously update from the server 124 until the user 310 checks out 320 of the place 220 or leaves the place 220.

At step 532, the GPS module 108 determines if a change in GPS coordinates was made and confirms the user 310 is still within the place 220 selected.

At step 534, the GPS module 108 must confirm the user 310 is within the specific place 220 before it allows the application to move to step 536. If the GPS module 108 fails to confirm the user 310 is within the specific place, the application goes back to step 504 to determine what places 220 the user 310 is near.

At step 536 the check-in module 114 reports to the device application 106 if the user 310 has selected to check out 320 of the place 220. If the device application 106 confirms the user 310 has selected to check out 320, the application goes back to step 504. If the user 310 has not selected to check out 320 of the application, step 538 allows the user 310 to input their message 430 within the message module 116. The message module 116 will relay the message to the processing and communication module 118 and will be sent over the network 122 to the server 124.

At step 540, the servers 124 web socket 134 will receive the message 430 and relays the message to the message management module 136 for further distribution while also storing the message in the chat history management module 138.

At step 542, the message management module 136 will send the message to other users 310 checked-in at the same specific place. The server 124 will continuously preform database queries to continuously provide the message module 116 within the mobile device 102 updated information about the checked-in status of other users in the room, recent messages, and other information. Furthermore, the check-in module 114 within the mobile device 102 will continuously check the GPS module 108 to determine if the user has checked out or left the place 220. Check out selection can be by user selection, user movement from the location, or by a timeout operation.

In some embodiments, check-in module 114 can be configured to present the user of the mobile device 102 with a user interface that allows the user to make check-in and checkout selections on the screen of the mobile device. Check-in selections allow the user to specify which of the nearby places the user would like to check into. Once checked in, the user can participate in real time communication with other users that have checked into that location. Checkout selections allow user to disengage from communication and allow the user to check into other locations. This allows the user to selectively engage and disengage in real time conversation with other nearby users, based on the user's check-in status. In some embodiments, check-in module 114 performs check out automatically by monitoring the position of the mobile device. For example, when a user moves too far (e.g., more than 100 m) from of the location she is currently checked into, the check-in module on that mobile device can automatically check out of that location and communicate that change in status to the server. This allows the service to mimic real-world behavior in the selective interaction of a user with nearby users. For example, in the real world, when a person physically leaves an area, that person no longer participates in the conversation at that location.

It should be understood that the check-in module and message module interact to facilitate selective connection of the user with real-time communications of other users of mobile devices within the same vicinity. For example, when a user is at a specific physical location as indicated by the GPS sensor of the user's mobile device, that user can be said to be in the vicinity of all locations within a predetermined distance of the GPS location. In some embodiments, the vicinity is dictated by a radius of approximately 100 m from the current GPS location of that device. In some embodiments, the vicinity is dictated by whether or not the user's mobile device can detect radio signals from a given location. For example, the place of business may have a Wi-Fi network having an access point with a predetermined identifier. When the Wi-Fi antenna (e.g. acting as a location sensor) of the mobile device detects that Wi-Fi network, the application on the mobile device can note the proximity between the mobile device and that network and determine the location is therefore within the same vicinity as the user.

Once the location of the user has been identified and the nearby locations coincident with a vicinity associated with that location are determined, the user may check into one of those nearby locations. By doing so, the check-in module communicates with the server and the message module to allow the message module and server to selectively connect the user via a real-time communications network (e.g. the Internet) to mobile devices for other users, facilitating real-time messaging between mobile devices. In some embodiments, the message module will intentionally restrict communication to the user's device and any devices not also checked into that location within the application. The user may still be allowed to use other messaging applications on the device, such as social networking or text messaging applications, to interact with other users. However within the application, the message module will limit communication between the user and only those other mobile devices that have checked in to the selected location. This allows the user to have a contextual forum to communicate in real time with other users based primarily on the physical proximity of users to a location.

In the event that multiple nearby locations are available within the vicinity of the user's device, the user may be presented with a screen to actively select the location to check into, allowing the user to limit the real-time conversation with only a subset of users within the vicinity, namely those users that are also checked into that nearby location within the vicinity of the user.

In some embodiments, the check-in module automatically checks in a user without requiring a user selection, particularly where there is only one available nearby place. In some embodiments, user preferences dictate whether a user is automatically checked into a place or which place the user prefers to automatically be checked into. For example, a favorite location can be given priority for check-in.

Figure 6:
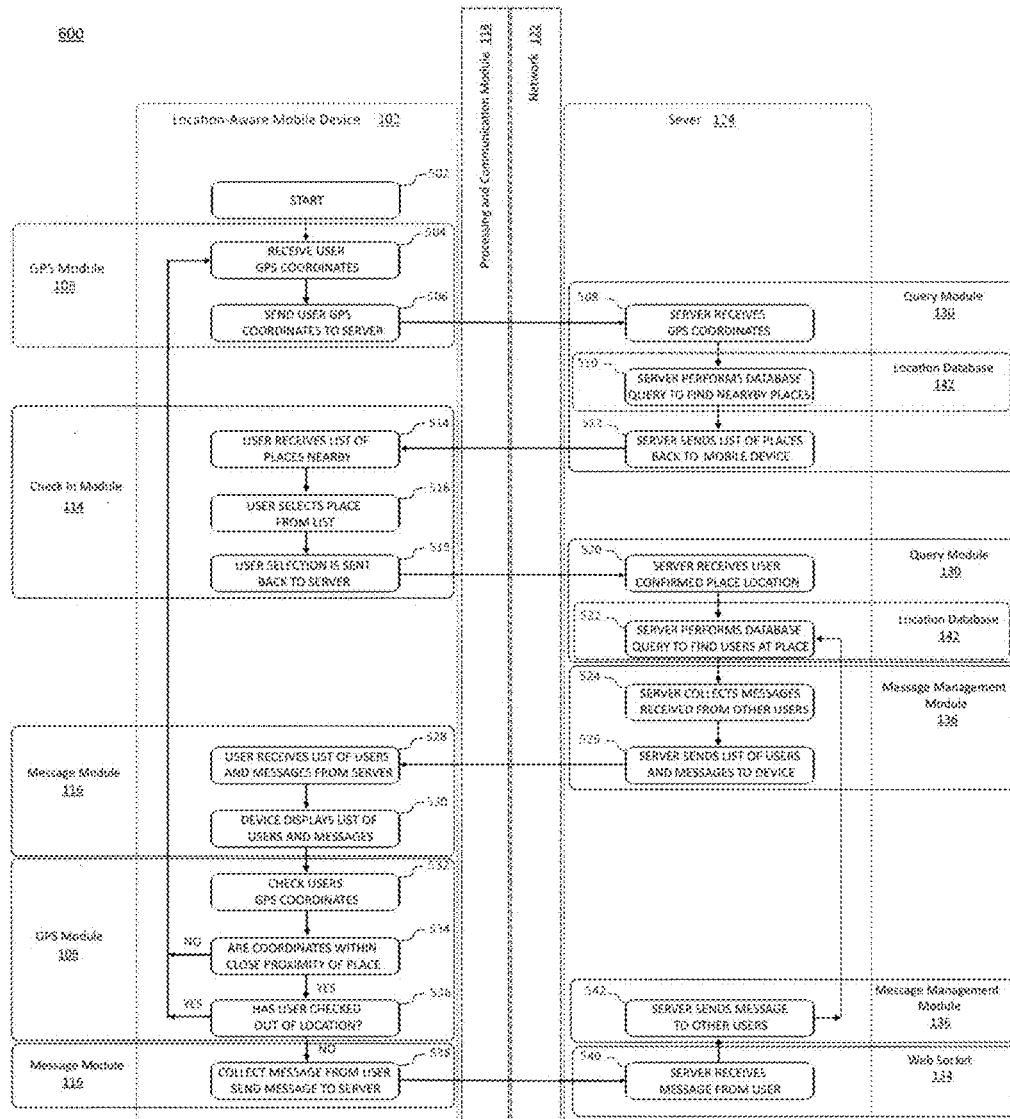
FIG. 6 is a flow chart of exemplary procedures and methods that facilitate location-based communication between a plurality of location-aware mobile devices and the computer based server.

FIG. 6 depicts method 600, which is a flowchart of the method depicted in FIG. 5 in a form to illustrate the information flow and communication between application modules within the mobile device and the server. A user of mobile device 102 opens the application at step 502. Steps 504 and 506 are handled by GPS module 108, resulting in the geographic coordinates of the device. This information is sent across network 122 via processing and communications module 118 to server 124. Query module 130 handles steps 508 and 512, while step 510 is handled by location database 142, resulting in a list of selectable nearby places sent via network 122 and processing and communications module 118 to check-in module 114 of the mobile device 102. Check-in module 114 handles steps 514, 516, and 518, resulting in a user selection of a place to check into, which is sent to the server 124. Query module 130 performs step 520, while location database 142 performs step 522. Message management module 136 performs steps 524 and 526, resulting in messages and lists of checked-in users being sent to mobile device 102.

Message module 116 of the mobile device handles steps 528, 530, and 538, while GPS module 108 handles steps 532-536. This results in messages from the user being sent to the server 124. Web socket 134 of the server handles step 540, while Message management module 136 performs step 542.

Embodiments of the present disclosure, for example, are described above with reference to block diagrams and/or operational illustrations of the methods and systems according to embodiments of the disclosure. The functions and steps noted in the blocks may occur out of order as shown in any flowchart. For example, two blocks shown in succession may in fact be executed substantially concurrently or the blocks may sometimes be executed in the reverse order, depending upon the functionality and steps involved.

While certain embodiments of the disclosure have been described, other embodiments may exist. The scope of this disclosure encompasses all changes, variations, and other modifications to the examplary embodiments described or illustrated herein that a person having ordinary skill in the art would comprehend. The scope of this disclosure is not limited to the examplary embodiments described or illustrated herein. Moreover, although this disclosure describes and illustrates respective embodiments herein as including particular components, elements, features, functions, operations, or steps, and of these embodiments may include any combination of permutation of any of the components, elements, features, functions, operations, or steps described or illustrated anywhere herein that a person having ordinary skill in the art would comprehend.

What is claimed is:

1. A location-based system for enabling location-aware communication amongst location-aware mobile devices, the location-based system comprising:
   a processor; and
   a computer program product tangibly embodied in a non-transitory computer readable storage medium on a location-aware mobile device, the computer program product comprising computer-readable instructions operable to cause the processor to:
   implement a location-determination module configured to generate location information indicating a current geographical location of the mobile device;
   receive the location information from the location-determination module;
   identify one or more nearby places within a specific nearby geographical location of the current geographical location of the mobile device;
   display a list of the identified one or more nearby places to a user of the mobile device and receive a selection of a specific nearby place from a user of the mobile device;
   facilitate a check-in selection, by the user, into the specific nearby place;
   connect the user, via a real-time communications network, to one or more mobile devices of other users currently located at the specific nearby place;
   while the user remains connected to the other users at the specific nearby place, prevent the user from communicating, via the location-based system, with mobile device users currently located outside of the specific nearby geographical location of the current geographical location of the mobile device; and
   automatically facilitate a check-out selection, by the user, from the specific nearby place, to end communication with the users of the other mobile devices at the specific nearby place in an event the mobile device is moved outside the specific nearby geographical location of the selected specific nearby place.

2. The location-based system of claim 1, wherein the check-in selection is configured to allow the user to selectively communicate with users of other mobile devices who have also made a check-in selection at the specific nearby place.

3. The location-based system of claim 2, wherein the check-out selection is configured to allow the user to make another check-in selection at another one of the identified one or more nearby places.

4. The location-based system of claim 1, wherein said location-determination module is configured to receive Global Positioning System (GPS) coordinates of the mobile device indicating the current geographical location of the mobile device from a GPS sensor of the mobile device.

5. The location-based system of claim 1, wherein the instructions are further configured to implement a profile module configured to store profile information of the user of the mobile device.

6. The location-based system of claim 1, wherein the instructions are further configured to implement a processing and communication module configured to provide communication between a client application, configured for operating on the location-aware mobile device, and a server via said real-time communications network.

7. The location-based system of claim 6, wherein said server comprises a location database, a user database, and a user-provided database.

8. The location-based system of claim 7, wherein said server comprises a database query module configured to compare the geographical location of the mobile device to geographical locations of potential nearby places.

9. The location-based system of claim 8, wherein said processing and communication module is configured to send the information regarding the geographical location of the mobile device to the server and the server is configured to employ said query module and said location database to generate the list of the identified one or more nearby places and communicate said list to said processing and communication module on the mobile device.

10. The location-based system of claim 9, wherein said processing and communications module is configured to relay said list of the identified one or more nearby places to the check-in module.

11. The location-based system of claim 9, wherein the instructions are further configured to send, upon selection of the specific nearby place by the user, the user's selection to the server.

12. A method of facilitating real-time communications among users of location-aware mobile devices located within proximity to one another, the method comprising:
   generating, via a processor of a mobile device, location information indicating a current geographical location of a mobile device;
   communicating, by the processor, the location information regarding the current geographical location of the mobile device to a server over a network;
   identifying, by the processor, based on information received from the server, a list of nearby places within a specific nearby geographical location of the current geographical location of the mobile device for display to, and selection by, a user of the mobile device;

in response to receiving, from the user, a selection of a specific nearby place from the list of the nearby places, checking-in the user, into the specific nearby place, and thereby, connecting the user, by the processor via a real-time messaging interface over a network, to one or more mobile devices of other users currently located at the specific nearby place;

while the user remains connected to the other users at the specific nearby place, preventing the user from communicating, via the real-time messaging interface, with mobile device users currently located outside of the specific nearby place; and automatically checking-out the user, from the specific nearby place, and, thereby, ending communication with the users of the other mobile devices at the specific nearby place, in an event the mobile device is moved outside the specific nearby geographical location of the selected specific nearby place.

13. The method of claim 12, further comprising allowing the user to selectively communicate with users of other mobile devices who have also made a check-in selection at the specific nearby place.

14. The method of claim 13, further comprising allowing the user to make another check-in selection at another place from the list of the nearby places.

15. The method of claim 12, further comprising storing profile information of the user of the mobile device and utilizing the profile information to configure the real-time messaging interface in accordance with user preferences.

16. The method of claim 12, further comprising configuring the server to compare the current geographical location of the mobile device to geographical locations of a plurality of potential nearby places.

17. A method of facilitating real-time communications among users of location-aware mobile devices located within proximity to one another, the method comprising:

configuring a location-determination module on a mobile device, the location-determination module being configured to generate location information indicating a current geographical location of the mobile device;

configuring, on the mobile device, a check-in module in communication with the location-determination module, the check-in module being configured to receive the information regarding the current geographical location of the mobile device and identify one or more nearby places within a specific nearby geographical location of the current geographical location of the mobile device for display to, and selection by, a user of the mobile device;

configuring, on the mobile device, a message module to selectively connect, in response to receiving, from the user, a selection of a specific nearby place from the list of the nearby places, the user via a real-time communications network to one or more mobile devices of other users currently located at the specific nearby place; and while the user remains connected to the other users at the specific nearby place, prevent the user from communicating, via the message module, with mobile device users currently located outside of the specific nearby place;

wherein configuring said check-in module includes configuration to facilitate a check-in selection, by the user, into the specific nearby place, and an automatic check-out selection, by the user, from the specific nearby place, in an event the mobile device is moved outside the specific nearby geographical location of the specific nearby place, to end communication with users of the other mobile devices at the specific nearby place.

18. The method of claim 17, wherein the check-in selection is configured to allow the user to selectively communicate with users of other mobile devices who have also made a check-in selection at the specific nearby place.

19. The method of claim 18, wherein said configuration to facilitate a check-out selection is configured to allow the user to make another check-in selection at another one of the one or more nearby places.

20. The method of claim 17, further comprising configuring a processing and communication module to provide communication between the client application and a server via said communications network.

21. The method of claim 20, further comprising configuring said server to include a location database, a user database and a user-provided database.

22. The method of claim 21, further comprising configuring said server to include a database query module configured to compare the geographical location of the mobile device to a plurality of potential nearby places.

23. The method of claim 22, further comprising configuring said processing and communication module to send the information regarding the current geographical location of the mobile device to the server and configuring the server to employ said query module and said location database to generate a list of said nearby places and to communicate said list to said processing and communication module on the mobile device.

* * * * *